Aug. 13, 1935. F. D. CHAPMAN 2,011,332
LEAKY CAN DETECTOR
Filed Aug. 21, 1931 3 Sheets-Sheet 1
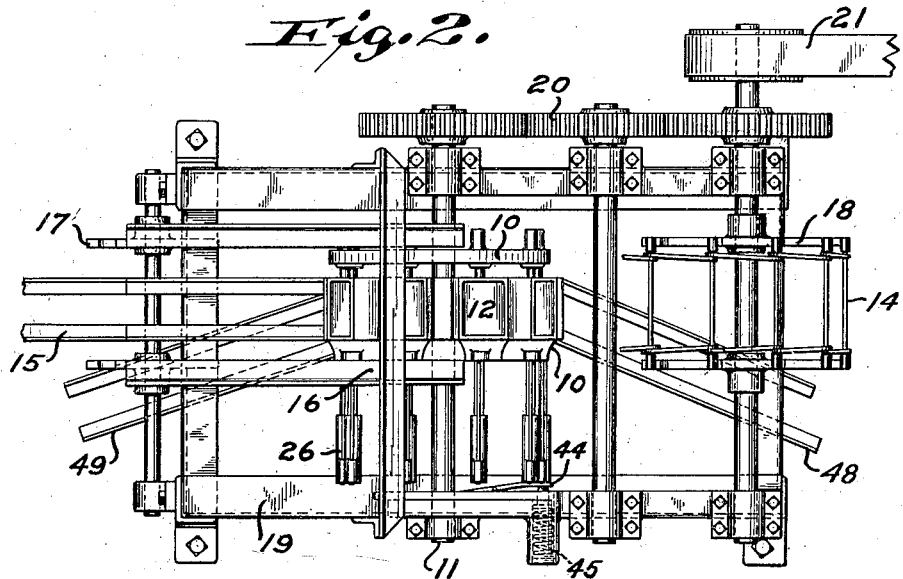
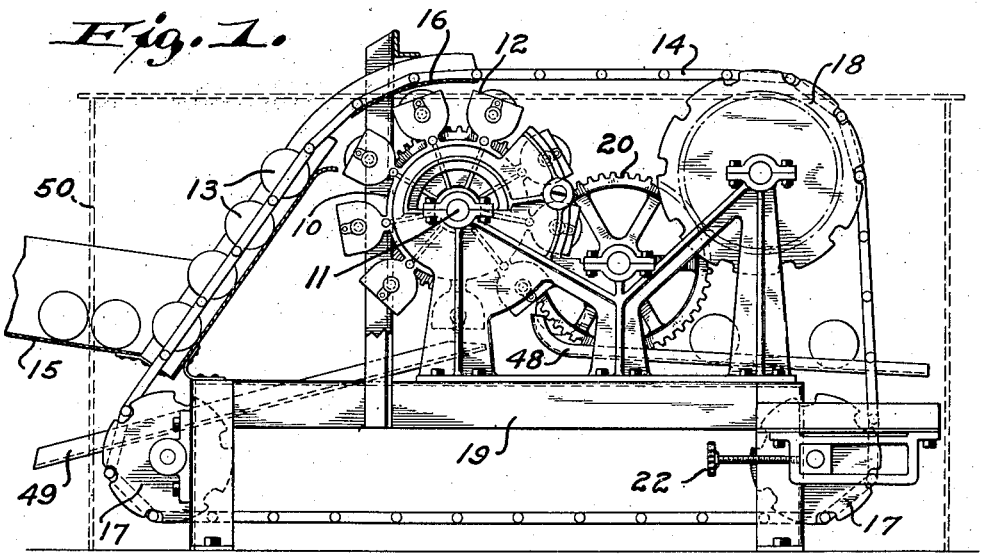
INVENTOR.
F. D. Chapman
BY
Morsell & Morsell
ATTORNEY.

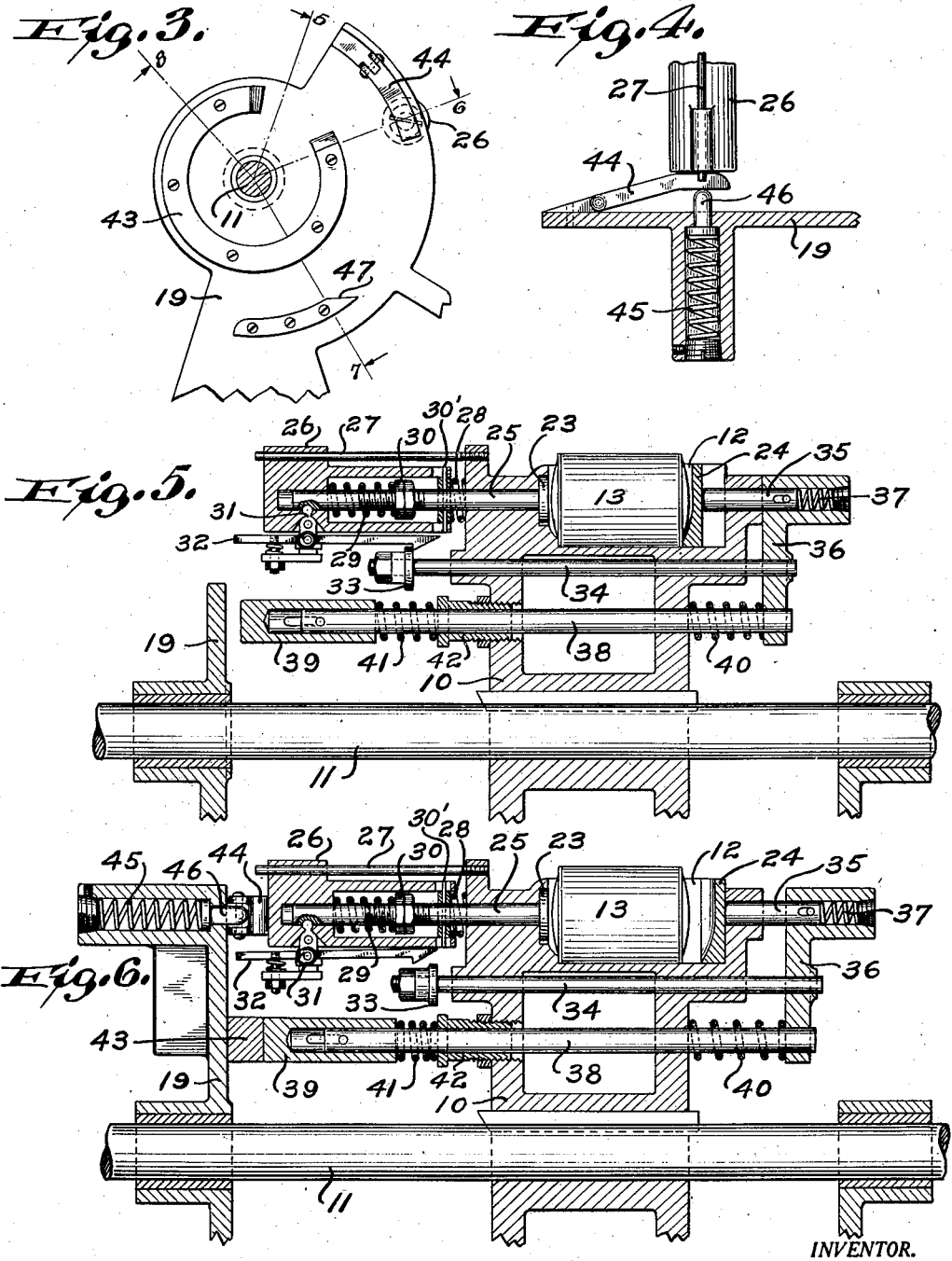

Aug. 13, 1935.   F. D. CHAPMAN   2,011,332
LEAKY CAN DETECTOR
Filed Aug. 21, 1931   3 Sheets-Sheet 3
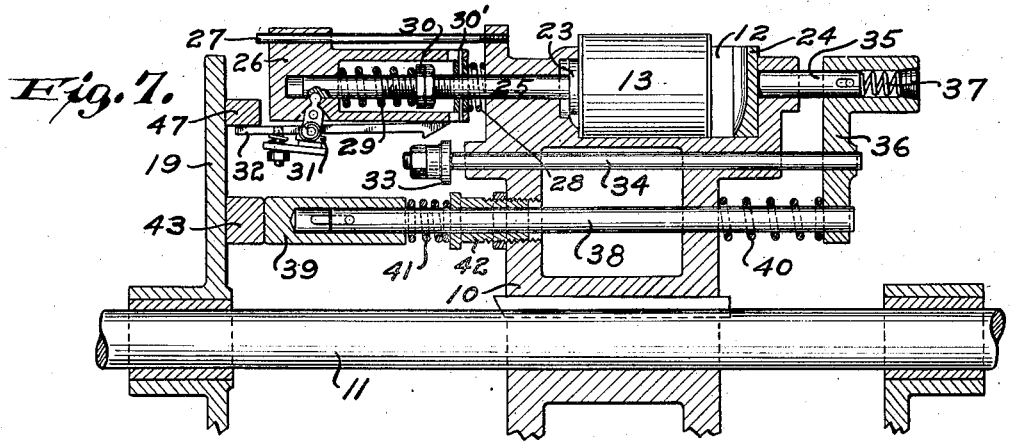
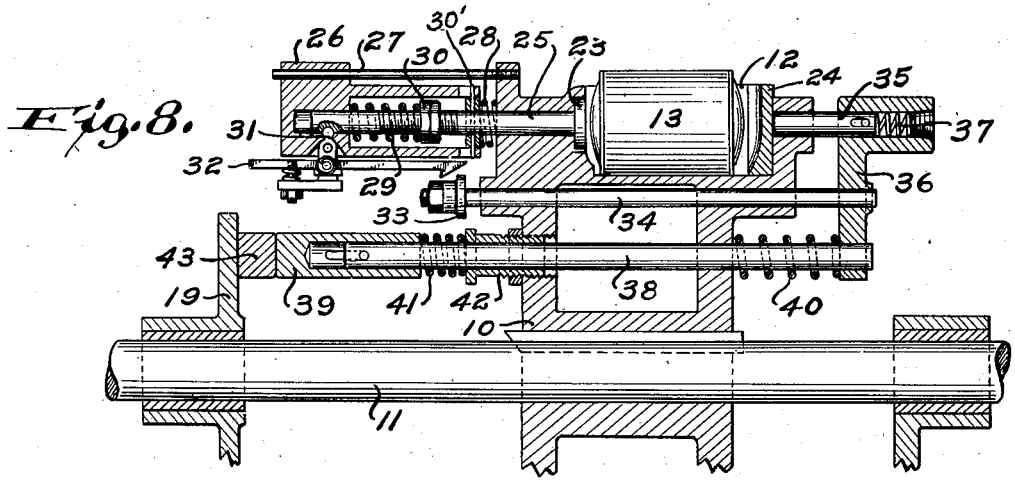
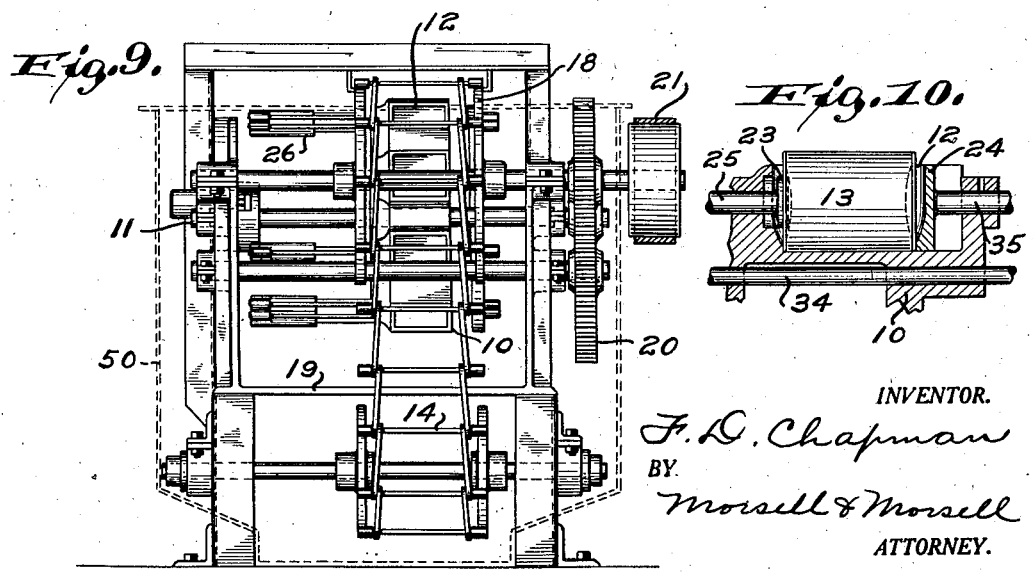
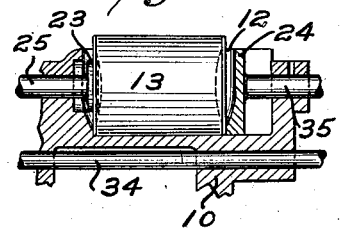
INVENTOR.
F. D. Chapman
BY
Morsell & Morsell
ATTORNEY.

Patented Aug. 13, 1935

2,011,332

UNITED STATES PATENT OFFICE 2,011,332

LEAKY CAN DETECTOR

Frank D. Chapman, Berlin, Wis.

Application August 21, 1931, Serial No. 558,491

7 Claims. (Cl. 73—51)

The present invention relates in general to improvements in the art of detecting imperfections in containers, and relates more specifically to improved apparatus for detecting leaks in food laden cans or the like.

Generally stated, the object of the present invention is to provide an improved leaky can detector which is simple in construction and which is moreover highly efficient in operation.

It is common commercial practice in the canning industry, to utilize cylindrical tin cans for the purpose of housing food products or the like, and to confine the commodities against exposure to the atmosphere. When the food laden cans have been hermetically sealed under certain conditions, and the cans are perfect, a positive pressure greater than atmospheric, exists within the cans, frequently causing outward distortion of the can heads or ends. When the cans are packed and sealed under other conditions, and the cans are perfect, negative pressure below atmospheric exits within the cans, often resulting in inward distortion of the can ends by the atmospheric pressure. Under any conditions of packing, if the cans are leaky and not hermetically sealed, the pressure within the defective cans is the same as that of the surrounding atmosphere, and the can ends are therefore readily flexible either inwardly or outwardly without offering any appreciable resistance. In most cases, exposure of the product to the atmosphere for any considerable length of time, causes deterioration or spoilage and the fluent product will escape from the leaks. It is therefore necessary to detect the leaky condition, either before or after the cans are filled, and the detection may also be effected either before the confined product has been processed or after partial or complete processing has been accomplished.

Numerous methods of detecting leaks in food laden cans, have heretofore been proposed, but without any marked degree of success. It has heretofore been attempted to utilize the degree of inward or outward bulging of the can heads or ends, in order to separate the defective cans from the perfect ones, but this method is objectionable and inefficient because variations in the characteristics of the metal will prevent uniform bulging of the can ends under similar pressure differences. The prior devices are therefore commercially impractical and unreliable because of their defective principles of operation and also because of their inability to accurately segregate the defective from the perfect cans.

It is a more specific object of the present invention to provide improved apparatus for effectively separating defective food laden cans from perfect ones, by utilizing the pressure conditions within the finally sealed cans to effect the separation.

Another specific object of the invention is to provide simple, compact and automatically operating apparatus for effecting separation of the perfect and imperfect cans of a series.

Still another object of the invention is to provide apparatus which is readily adjustable to cooperate with various sizes and shapes of cans, and which will produce the desired result regardless of whether the internal can pressure is positive or negative.

These and other objects and advantages of the present invention, will be apparent from the following detailed description.

A clear conception of an embodiment of the improvement and of the mode of constructing and of operating apparatus to carry on the improved method of detecting leaks and of separating defective from perfect cans, may be had by referring to the drawings accompanying and forming a part of this specification in which like reference characters designate the same or similar parts in the various views.

Fig. 1 is a part sectional side elevation of one of the improved leaky can detectors;

Fig. 2 is a top view of the apparatus shown in Fig. 1;

Fig. 3 is an enlarged inside view of a fragment of the rotor supporting frame of the machine, looking toward the actuating cams;

Fig. 4 is a part sectional side view of the outermost or movable actuating cam;

Fig. 5 is a fragmentary longitudinal sectional view through the detector rotor and supporting frame, taken on the radial line 5 of Fig. 3, and showing a can as positioned after being clamped into its carrier pocket;

Fig. 6 is a similar sectional view through the rotor and frame, taken on the radial line 6 of Fig. 3, and showing a perfect can after release thereof and preparatory to its delivery from the rotor;

Fig. 7 is another similar sectional view through the rotor and frame, taken on the radial line 7 of Fig. 3, and showing a defective or leaky can after release thereof and preparatory to its delivery from the rotor;

Fig. 8 is still another similar sectional view through the rotor and frame, taken on the radial line 8 of Fig. 3, and showing a can just after delivery thereof to one of the rotor pockets and prior to clamping;

Fig. 9 is an end elevation of the improved leaky can detector; and

Fig. 10 is an enlarged fragmentary sectional view through one of the carrier pockets, showing a can with negative pressure or a vacuum established therein.

The improved leaky can detector specifically shown in the drawings by way of illustration of one practical embodiment of the invention, comprises in general a rotor 10 mounted upon a horizontal shaft 11 and having an annular series of peripheral carrier pockets 12 which are adapted to receive the food laden cans 13 in succession from an endless conveyor 14 cooperating with a can supply chute 15. The endless conveyor also coacts with a guide plate 16 and with driving and idler sprockets 17, 18 respectively, mounted upon a main frame 19 which also supports the shaft 11; and the rotor 10 and the conveyor 14 are simultaneously operable by means of gearing 20 and a driving belt 21 to cause the rotor 10 to revolve in a clockwise direction and the upper run of the conveyor 14 to move toward the right, as viewed in Fig. 1. The tension upon the endless conveyor 14 may be varied by means of a tension regulator 22 coacting with one of the idler sprockets 17 as shown in Fig. 1.

Each of the can receiving and carrier pockets 12 of the rotor 10, is provided at one end with a plunger 23, and at its opposite end with a reaction block 24, as shown in Figs. 5, 6, 7, and 8. The stem 25 of each plunger 23, extends away from the adjacent pocket 12 and into a housing 26 which is slidably supported upon a guide rod 27 rigidly attached to the rotor 10 and disposed parallel to the plunger stem 25. Each of the housings 26 is constantly urged away from the corresponding pocket 12, by a relatively light compression spring 28, and a heavier compression spring 29 disposed within each housing 26, coacts with an adjusting nut 30 engaging screw threads on the adjacent plunger stem 25 and with an internal end surface of the housing. The light springs 28 tend to urge the housings 26 and the plungers 23 away from the pockets 12, and the heavy springs 29 tend to force the plungers 23 away from the housings 26 and into the pockets 12, the nuts 30 and the lock nuts coacting therewith, serving to vary the effectiveness of the heavy springs 29. Pins 30' extending through the rods 25 and coacting with slots in the housings 26, provide lost motion connections permitting relative displacement of the plungers 23 and housings 26.

The end portion of each stem 25 remote from the plunger 23, is notched to coact with a small lever 31 which is pivoted at its medial portion to the housing 26 and the lower end of which carries a spring pressed latch 32 having a hook which is engageable with an abutment 33 adjustably attached to a rod 34, there being a latch 32 and rod 34 associated with each pocket 12 and housing 26. The stem 35 of each clamping block 24, extends into a bore in an end bracket 36, there being one of these brackets rigidly attached to the end of each of the rods 34 remote from the abutment 33 thereon, and a relatively heavy compression spring 37 coacting with the end of each block stem 35, tends to urge the corresponding block 24 away from its bracket 35 and along the adjacent pocket 12.

The parallel rods 34 are slidably supported in the rotor 10 and other rods 38 have their corresponding ends secured to the adjacent brackets 36, and have their opposite ends provided with caps 39 slidably supported upon the rod ends. The rods 34 and 38 may be rigidly attached to the bracket 36 in any suitable manner, as by riveting or welding. The parallel rods 38 are also slidably supported in the rotor 10, and a transverse pin passing through each of the rods 38, coacts with slots in the adjacent cap 39 to permit relative sliding between the rod and cap. A compression spring 40 embraces each rod 38 between the adjacent bracket 36 and the rotor 10, and tends to urge the bracket 36 away from the rotor 10. Another spring 41 embraces the opposite end portion of each rod 38 between the adjacent cap 39 and the opposite side of the rotor 10, the tension of the springs 41 being variable by means of adjustable bushings 42 coacting with the rotor 10 and with the ends of these springs.

The portion of the main frame 19 which supports the rotor 10 and which is located adjacent to the path of travel of the housings 26, is provided with a series of cams as shown in Figs. 3 to 8 inclusive. A fixed curved can clamping cam 43 secured to the frame 19, extends about three-fourths of the distance around the rotor shaft 11, and is adapted to cooperate with the caps 39 in succession, during revolution of the rotor 10. A pivotally movable perfect can release cam 44 is hingedly associated with the frame 19 near the gap between the ends of the cam 43, this movable cam 44 being constantly urged toward the path of travel of the housings 26 by means of a compression spring 45 coacting with a plunger 46, see Fig. 4. A fixed defective can release cam 47 is secured to the frame 19 beyond the movable cam 44, this latter cam 47 being cooperable with the ends of the latches 32 remote from the latch hooks, under certain conditions of operation.

A can chute 48 is disposed beneath the downwardly movable portion of the rotor 10 as shown in Fig. 1, this chute being adapted to deliver the successive good or perfect cans 13 from the apparatus. A second can discharge chute 49 has its can receiving end disposed directly beneath the rotor shaft 11, and this second chute is adapted to deliver the defective or leaky cans 13 in succession, from the apparatus. The entire device may be disposed within a tank 50 as shown in dash lines in Figs. 1 and 9, but this enclosure is not essential and may be omitted.

During normal operation of the improved leaky can detector, the successive cans 13 are delivered by the supply chute 15 and chain conveyor 14 to the successive pockets 12 of the constantly or intermittently revolving rotor 10, the cans 13 dropping freely into the pockets. At the time of delivery of the cans to the rotor 10, the mechanism associated with the receiving pocket 12 is in the position illustrated in Fig. 8 with the plunger 23 and the block 24 withdrawn as far as possible, so as not to interfere with free entry of the cans. The specific disposition of the several parts of the mechanism preparatory to receiving a fresh can 13, will be more fully described following the description of the delivery of all of the cans from the pockets 12.

When a pocket 12 has received a food laden can 13 after the latter has been finally capped and sealed, and either before or after complete processing of the product therein, the pocket 12 is carried forward by the revolution of the rotor 10 until the cap 39 passes beyond the upper end of the fixed cam 43, as shown in Fig. 5. The moment the cap 39 leaves the cam 43, the spring 41 which overpowers the spring 40 on the rod 38, becomes effective to move the bracket 36, rod 34, and clamping block 24 toward the left to the position shown in Fig. 5, thereby firmly clamping the edge portions of the opposite can ends between the edge portions at the left of the pocket 12 and the edge portions of the block 24 at the right. The heads or ends of the clamped can 13 are however free to flex as diaphragms. During the can clamping movement, the abutment 23 on the rod 34 is brought into engagement with the hook end of the latch 32, the hook of the latch being forced inwardly over the abutment edge by means of the small spring coacting with the opposite end portion of the latch and with the lever 31. The housing 26 which carries the latch 32 and lever 31 is poised upon the rod 27 by means of the spring 28 and the spring 29 coacting with the plunger rod 25, and the plunger 23 may or may not coact with the adjacent end head of the clamped can 13, but without exerting any appreciable pressure thereon.

As the rotor 10 proceeds, it eventually advances the pocket 12 and can 13 until the housing 26 engages and rides along the spring pressed pivoted cam 44. This cam 44 urges the housing 26 and the plunger 23 associated therewith toward the right. If the can 13 with which the plunger 23 then coacts, is heremtically sealed, the internal pressure within the can will cause the ends thereof to resist inward distortion due to the increasing pressure thereon created by the plunger 23. Continued advancement of the housing 26 will therefore eventually cause the spring 29 to be compressed due to relative movement of the housing and plunger permitted by the lost motion connection afforded by the pin 30' and the adjacent housing slots, to such an extent that the latch supporting lever 31 will be swung in a counter-clockwise direction about its pivot on the housing 26, and will release the hooked end of the latch 32 from the abutment 33 as indicated in Fig. 6. The release of this lock afforded by the latch and the abutment, and the fact that the cap 39 simultaneously rides into engagement with the fixed cam 43 and thereby compresses and disables the spring 41, permits the spring 40 to become effective to quickly move the block 24 away from the can 13 and to unclamp or release the latter. The perfect or properly sealed can 13 is then free to be delivered by the continued revolution of the rotor 10, upon the can discharge chute 48, as the pocket 12 is subsequently inverted.

If the can 13 within a pocket 12 is punctured or otherwise leaky, the pressures within and without the defective can, are equal and free flexing of the can ends is unrestrained except by the metal itself. Under these conditions, when the can confining pocket 12 advances past the spring pressed pivoted cam 44, the corresponding plunger 23 and housing 26 are moved toward the can 13 without sufficient resistance to cause relative momement of the housing and plunger. The end of the defective can merely bends inwardly as the plunger 23 moves toward it, and the latch 32 therefore retains its engagement with the abutment 33, the can 13 remaining clamped within the pocket. Continued revolution of the rotor 10, however, eventually brings the extreme left end of the latch 32 into engagement with the fixed release cam 47 as shown in Fig. 7, whereupon the latch 32 is positively tripped. The cap 39 is at such time compressing the spring 41 so that the spring 40 immediately becomes effective to withdraw the clamping block 24 and to release the defective can 13. As this release of the defective can does not occur until after the carrier pocket 12 has passed the chute 48, the defective cans 13 are delivered upon the chute 49 and are thus segregated from the perfect cans.

Following this delivery of perfect and defective cans 13 from the successive pockets 12, the mechanism assumes the position shown in Fig. 8 and remains in this position until a new can 13 is supplied to the corresponding pocket 12. The latch 32 remains released from the abutment 33, the spring 41 remains compressed by the cap 39 and cam 43, and the spring 40 retains the block 24 to the extreme right. The plunger 28 and the housing 26 are held toward the extreme left, so that the entire assemblage is ready for subsequent actuation by the cams 44, 47 as previously described.

The foregoing cycle of events takes place with respect to each pocket during each revolution of the rotor 10, and the separation is therefore automatically effected at a speed dependent upon the speed of revolution of the rotor. The springs 29, 37, 41 and 45 are adjustable to accommodate various conditions and sizes of cans 13, and the separation is effectively accomplished regardless of whether the normal pressure within the cans 13 is positive, negative or atmospheric, providing the perfect cans are hermetically sealed. The can ends acting as diaphragms, are freely flexible in leaky cans, whereas in perfectly sealed cans, inward deflection of these ends is resisted by the pressure created within the confined space, and such internal pressure must result regardless of the characteristics or degree of bulging of the end heads. The device has proven highly effective in actual operation and is not dependent upon the condition of the confined product.

From the foregoing description it will be apparent that the present improvement provides highly efficient apparatus for segregating perfect and defective cans 13. The improved apparatus is simple and compact in construction, and performs its function automatically at any desired speed. The detector may be utilized in conjunction with other canning machinery, either before processing of the confined product has been started, after partial processing has been effected, or after complete processing of the commodity, and the various adjustments provided permit convenient adaptation of the device to meet any desired condition.

While the invention has been illustrated and described herein as being especially adapted for the treatment of cylindrical tin cans, some of the principles are obviously more generally applicable for the segregation of perfect from defective containers of other types.

It should be understood that it is not desired to limit the invention to the exact details of construction and to the precise mode of operation of the detector herein shown and described, for various modifications within the scope of the claims may occur to persons skilled in the art.

It is claimed and desired to secure by Letters Patent:

1. In combination, a rotor having a series of pockets, means for delivering hermetically sealed food laden cans to the successive pockets of said rotor, means associated with each of said pockets for mechanically applying inward pressure against an end of the can therein sufficient to distort a leaky can, and means coacting with said pressure applying means and operable by the internal resistance offered by the can to distortion to detect defects in the cans.

2. In combination, a rotor having a series of peripheral pockets, means for delivering cans to the successive pockets of said series, a spring pressed plunger movable into each of said pockets to apply inward pressure against an end of the can within said pocket sufficient to distort said can, means for holding said plunger in pressure applying position, and means operable by the internal resistance offered by the can to distortion by said plunger to release said plunger holding means when the can within said pocket is hermetically sealed.

3. In combination, means forming a series of pockets revoluble about an axis, means for delivering hermetically sealed food laden cans to the successive pockets of said series, means for clamping the cans within said pockets, a spring pressed plunger cooperable with the can in each of said pockets to apply an external pressure thereon sufficient to distort a leaky can, and means operable by the internal resistance offered by the can to distortion by said plunger to release said clamping means at a definite point in the course of travel of said pockets.

4. In combination, a rotor having a series of peripheral pockets, means for delivering hermetically sealed food laden cans to the successive pockets of said series, means for clamping the successive cans within said pockets, a plunger for applying a definite pressure to the end of the can within each of said pockets sufficient to distort a leaky can, means cooperating with said plunger and operable by the internal resistance offered by perfect cans to distortion by said plunger to release said clamping means at a definite time when the cans are perfect, and means cooperable with said plunger to release said clamping means at a different time when the cans within said pockets are defective.

5. In combination, a rotor having a series of pockets movable about a horizontal axis, means for delivering cans to the successive pockets of said series above said axis, means for clamping the cans within said pockets, a plunger coacting with the can in each of said pockets independently of said clamping means with sufficient pressure to distort only the defective cans, and means interposed between each of said plungers and said clamping means for releasing the latter dependent upon whether the cans are perfect or defective, said releasing means functioning to deliver the perfect cans at a point in advance of the point of delivery of the defective cans.

6. In combination, a series of pockets revolvable about an axis, means for delivering food laden cans to the successive pockets of said series, a plunger movable into each of said pockets to apply pressure against an end of the can sufficient to distort a leaky can, means for holding said plunger in pressure applying position, and means operable by the internal resistance offered by the can to distortion by said plunger to release said holding means when the can within said pocket is hermetically sealed.

7. In combination, a series of movable pockets, means for delivering food laden cans to the successive pockets of said series, a plunger for applying pressure against an end of the can in each pocket sufficient to distort a leaky can, means for holding said plunger in a predetermined position, and means operable by the internal resistance offered by the can to distortion by said plunger to release said holding means when the can being acted upon is hermetically sealed.

FRANK D. CHAPMAN.